(12) United States Patent  
Huang et al.

(10) Patent No.: US 7,123,472 B2  
(45) Date of Patent: Oct. 17, 2006

(54) COMMON PIVOT ARRANGEMENT OF PORTABLE COMPUTER

(75) Inventors: Chao-Ming Huang, Taipei (TW); Chin-Ku Chuang, Taipei (TW); Chi-Hsuan Hung, Taipei (TW)

(73) Assignee: Tatung Co., LTD, Taipei (TW)

( * ) Notice: Subject to any disclaimer, the term of this patent is extended or adjusted under 35 U.S.C. 154(b) by 39 days.

(21) Appl. No.: 11/078,366

(22) Filed: Mar. 14, 2005

(65) Prior Publication Data

US 2006/0133020 A1    Jun. 22, 2006

(30) Foreign Application Priority Data

Dec. 17, 2004    (TW) ............................... 93139333 A

(51) Int. Cl.
- *H05K 5/02* (2006.01)
- *H05K 7/16* (2006.01)
- *E05D 15/50* (2006.01)

(52) U.S. Cl. ........................ 361/681; 16/367; 188/71.7; 261/91

(58) Field of Classification Search .................. 16/225, 16/367; 261/91; 188/71.7, 72.9; 221/123; 451/469; 361/724, 777, 679–687

See application file for complete search history.

(56) References Cited

U.S. PATENT DOCUMENTS

| | | | |
|---|---|---|---|
| 6,628,506 B1 * | 9/2003 | Landry et al. | 361/680 |
| 2005/0102799 A1 * | 5/2005 | Huang | 16/367 |
| 2006/0107492 A1 * | 5/2006 | Chang et al. | 16/367 |

* cited by examiner

*Primary Examiner*—Hung Van Duong  
(74) *Attorney, Agent, or Firm*—Lowe Hauptman & Berner LLP

(57) ABSTRACT

A common pivot arrangement mounted on a base member with first and second locating holes is disclosed to include a hinge unit having first through holes corresponding to the second locating holes of the base member and second through holes, and a rotary device, which has a mount with through holes corresponding to the first locating holes and a wheel with mounting holes corresponding to the second through holes. For use in a notebook computer, the first through holes of the hinge unit are respectively fastened to the second locating holes of the base member with screws. For use in a tablet PC and the notebook computer, the second through holes of the hinge unit are respectively fastened to the mounting holes of the wheel with screws, and then the through holes of the mount are respectively fastened to the first locating holes of the base member with screws.

6 Claims, 4 Drawing Sheets

COMMON PIVOT ARRANGEMENT OF PORTABLE COMPUTER

RELATED APPLICATION

The present application is based on, and claims priority from, Taiwanese Application No. 093139333, filed Dec. 17, 2004, the disclosure of which is hereby incorporated by reference herein in its entirety.

BACKGROUND OF THE INVENTION

1. Field of the Invention

The present invention relates to a common pivot arrangement of a portable computer and more particularly, to such a common pivot arrangement, which is suitable for use in different types of portable computers.

2. Description of Related Art

A portable computer generally comprises a base member, and a display module pivoted to the base member. The display module is vertically rotatable relative to the base member, and horizontally rotatable relative to the base member. For example, in a notebook computer, the display module is rotatable relative to the base member between the close position and the open position; in a tablet PC, the display module is horizontally rotated relative to the base member and then closed on the base member for allowing data entry by the user with a touch pen.

According to conventional designs, a base member designed for notebook computer is not usable for making a tablet PC, and a base member designed for tablet PC is not usable for making a notebook computer. For a notebook computer, the base member has locating holes specifically designed for the mounting of a pivot arrangement for notebook computer. For a tablet PC, the base member has locating holes specifically designed for the mounting of a pivot arrangement for tablet PC.

Therefore, conventional designs do not allow the use of common base members for making notebook computers and tablet PCs. It is inconvenient to use different base members in different assembly lines for different types of portable computers. Further, using different base members for making different portable computers will also greatly increase the manufacturing cost.

SUMMARY OF THE INVENTION

The present invention has been accomplished under the circumstances in view. A common pivot arrangement in accordance with the present invention is mounted on a base member of a portable computer. The base member has a plurality of first locating holes and a plurality of second locating holes. The common pivot arrangement comprises a hinge unit and a rotary device. The hinge unit comprises a holder base and a hinge. The hinge comprises a fixed member fixedly mounted to the holder base, and a rotatable member rotated about a first axis relative to the fixed member. The holder base comprises a plurality of first through holes corresponding to the second locating holes of the base member respectively, and a plurality of second through holes. The rotary device comprises a mount, and a wheel pivotally mounted on the mount and rotated about a second axis relative to the mount, the second axis is perpendicular to the first axis. The mount comprises a plurality of through holes corresponding to the first locating holes of the base member respectively. The wheel comprises a plurality of mounting holes corresponding to the second through holes of the holder base of the hinge unit respectively.

In one application example of the present invention for use in a notebook computer, the first through holes of the holder base are respectively fastened to the second locating holes of the base member with screws.

In another application example of the present invention for use in a tablet PC and the notebook computer, the second through holes of the holder base are respectively fastened to the mounting holes of the wheel with screws, and then the through holes of the mount are respectively fastened to the first locating holes of the base member with screws.

Therefore, the common pivot arrangement of the present invention is suitable for use in a notebook computer as well as a tablet PC. This design of common pivot arrangement saves much portable computer manufacturing cost.

The aforesaid rotary device can be connectable to different display modules, for example, a display module for notebook computer or tablet PC.

Further, the holder base can be comprised stopper means, and the mount can be comprised stopper means adapted to stop the moving of the stopper means of the holder base. The stopper means of the holder base can be a rod, and the stopper means of the mount can be an end of a guide slot. The rod of the holder base can be formed with a screw hole and a screw bolt threaded into the screw hole and movable with the holder base along the guide slot and stopped at the end of the guide slot of the mount.

Further, the base member can be comprised of a top shell and a bottom shell. The first locating holes and second locating holes of the base member are respectively formed in the bottom shell and extending upwards. The base member further has a top surface, and a keyboard installed in the top surface.

DETAILED DESCRIPTION OF THE PREFERRED EMBODIMENT

Figure 1:
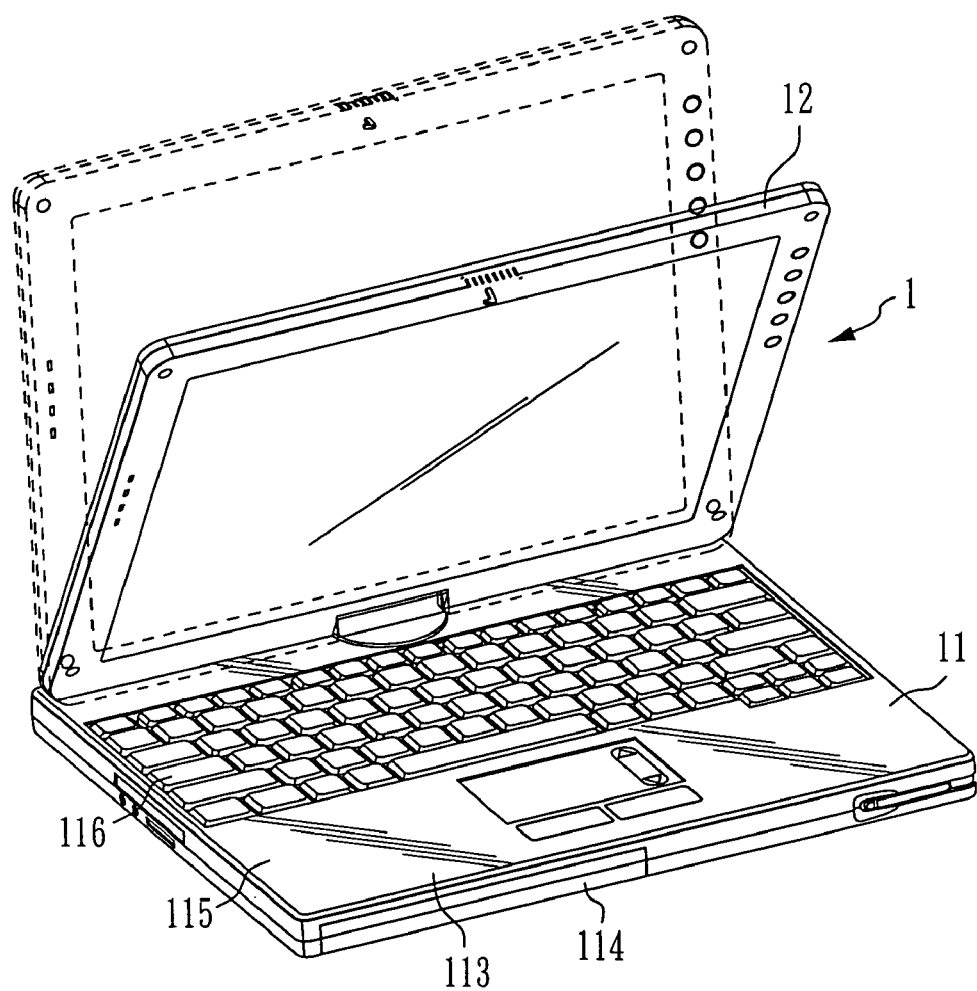
FIG. 1 is a schematic drawing showing a status of use of the present invention.

Referring to FIG. 1, a computer 1 is shown comprises of a base member 11 and a display module 12. According to this embodiment, the computer 1 is a portable computer. The base member 11 has a top surface 115, and a keyboard 116 installed in the top surface 115.

Figure 2:
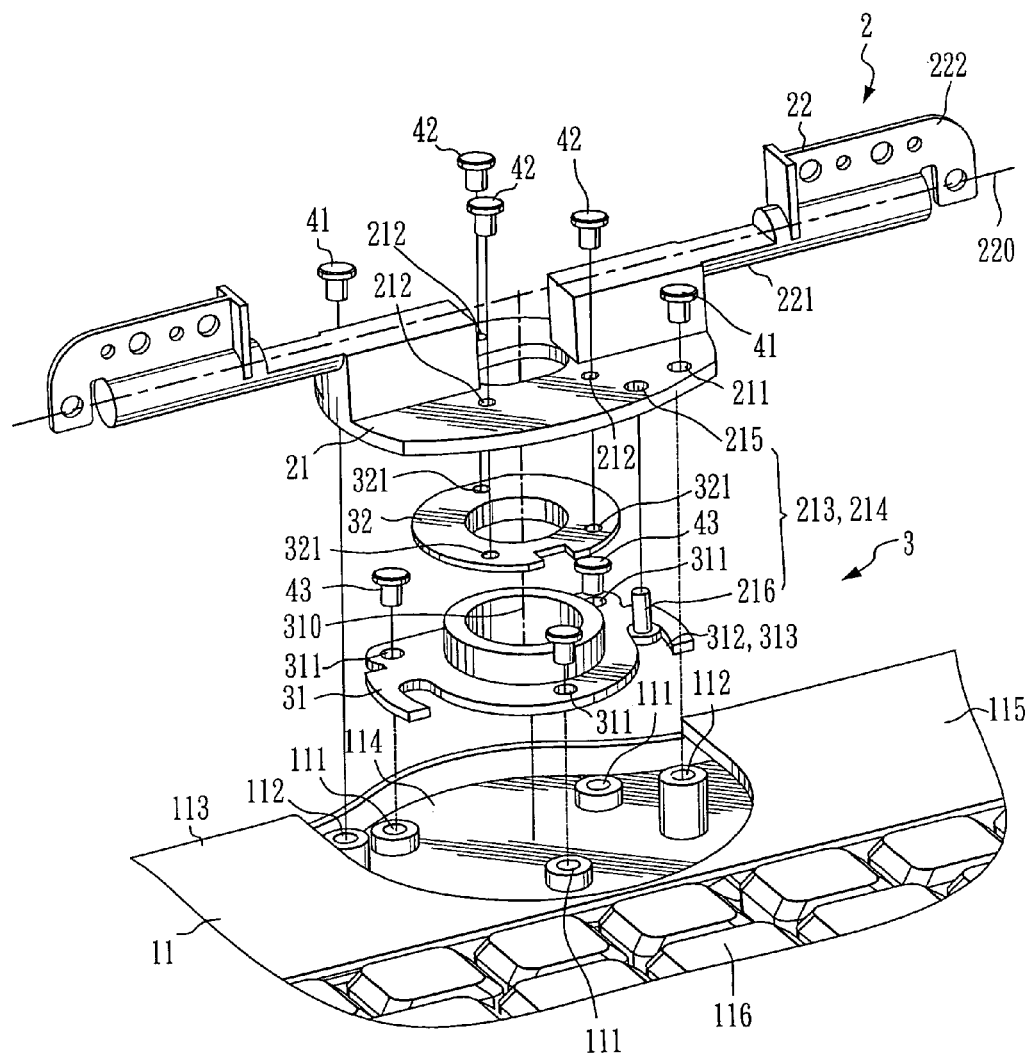
FIG. 2 is an exploded view of a common pivot arrangement of a portable computer according to the present invention.

Referring to FIG. 2 and FIG. 1 again, the base member 11 is formed of a top shell 113 and a bottom shell 114. The bottom shell 114 has three upwardly protruding first locating holes 111 and two upwardly protruding second locating holes 112.

The common pivot arrangement of the present invention is mounted on the base member 11, comprising a hinge unit 2 and rotary device 3. The hinge unit 2 comprises a holder base 21 and a hinge 22. The hinge 22 comprises a fixed member 221 fixedly mounted to the holder base 21, and a rotatable member 222 rotated about a first axis 220 relative to the fixed member 221. The rotatable member 222 is fixedly fastened to the aforesaid display module 12. The holder base 21 has two first through holes 211 corresponding to the two second locating holes 112 of the base member 11 respectively (the two first through holes 211 are disposed in the holder base 21 at two sides and only one first through hole 211 is seen in FIG. 2), and three second through holes 212.

Further, the rotary device 3 comprises a mount 31 and a wheel 32. The wheel 32 is pivotally mounted on the mount 31 and rotated about a second axis 310 relative to the mount 31, the second axis 310 is perpendicular to the first axis 220. The mount 31 has three through holes 311 corresponding to the three first locating holes 111 of the base member 11 respectively. The wheel 32 has three mounting holes 321 corresponding to the second through holes 212 of the holder base 21 of the hinge unit 2 respectively.

Further, the holder base 21 comprises stopper means 213. The mount 31 comprises stopper means 312. According to this embodiment, the stopper means 213 of the holder base 21 is a rod 214; the stopper means 312 of the mount 31 is an end of a guide slot 313. The rod 214 is formed with a screw hole 215 and a screw bolt 216. The screw hole 215 is formed in the holder base 21. The screw bolt 216 is threaded into the screw hole 215 and movable along the guide slot 313 and stopped at the end of the guide slot 313 of the mount 31.

Figure 3:
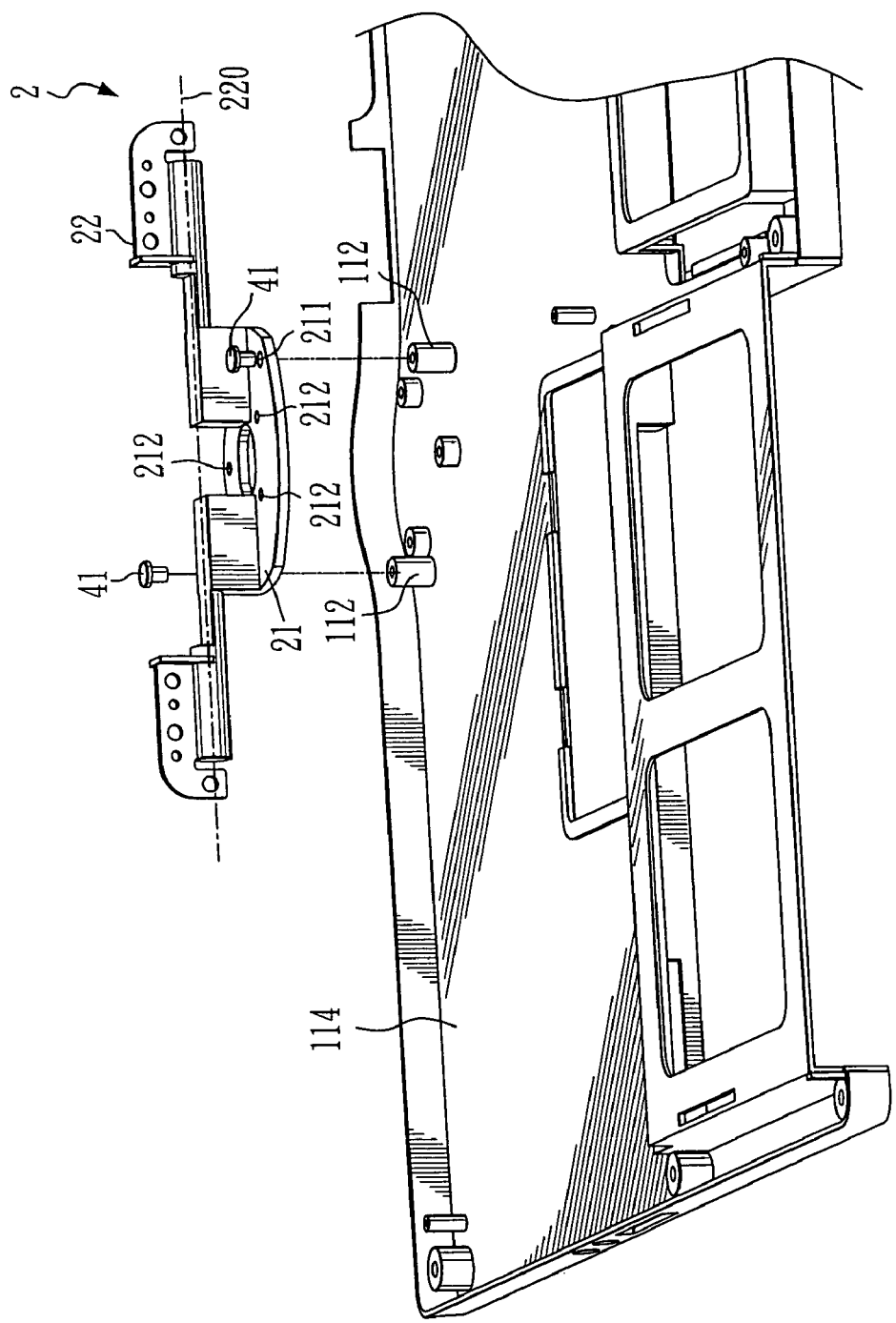
FIG. 3 is a schematic drawing showing a mounting example of the present invention.

Referring to FIG. 3 and FIG. 1 and FIG. 2 again, when wishing to use the computer 1 as a notebook computer, insert two screws 41 through the first through holes 211 of the holder base 21 and then thread the screws 41 into the second locating holes 112 of the base member 11 respectively.

Figure 4:
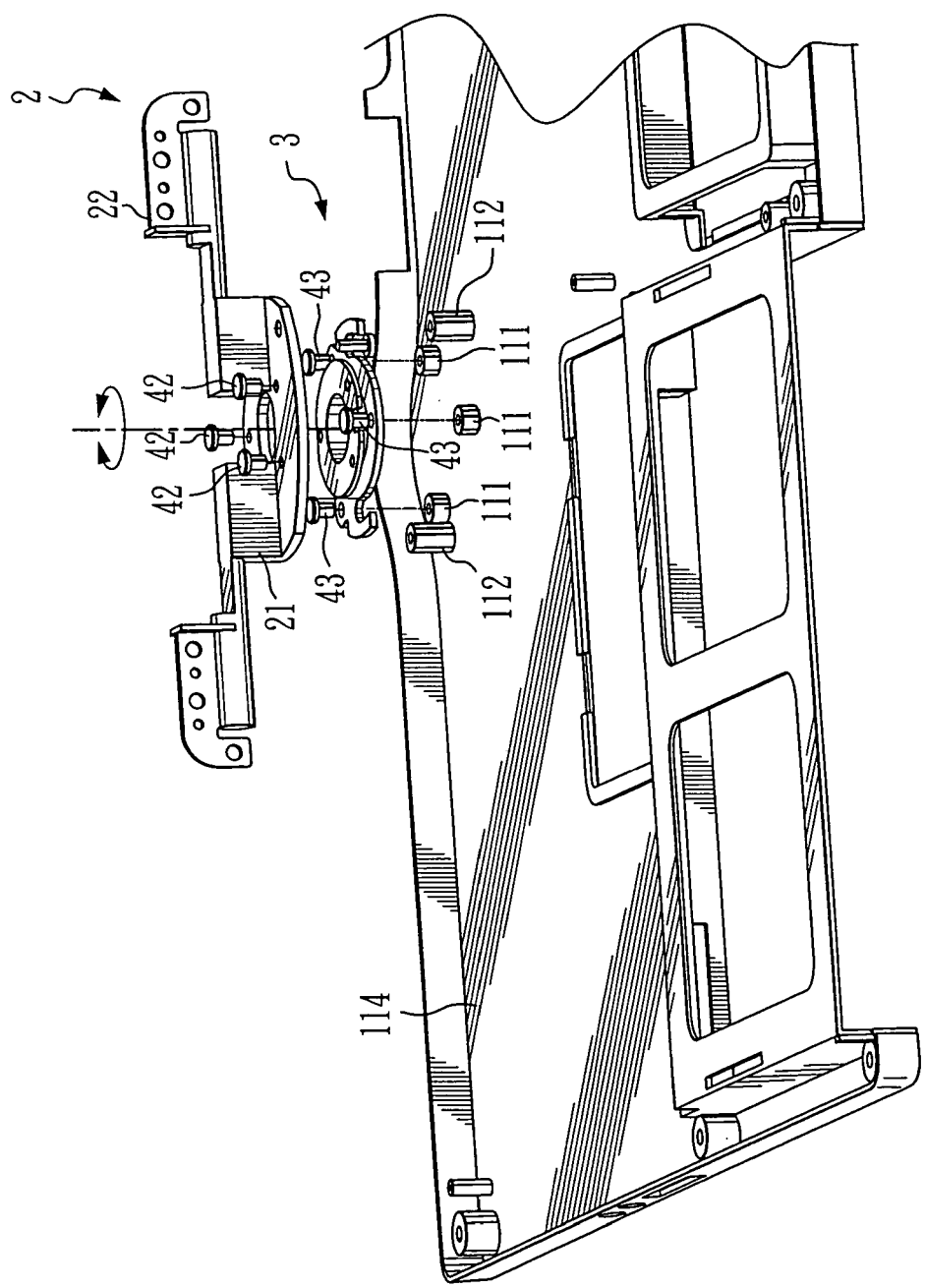
FIG. 4 is a schematic drawing showing another mounting example of the present invention.

Referring to FIG. 4 and FIG. 1 and FIG. 2 again, when wishing to use the computer 1 as a tablet PC and a notebook computer, fasten the second through holes 212 of the holder base 21 to the mounting holes 321 of the wheel 32 respectively with a respective screw 42, and then fasten the through holes 311 of the mount 31 to the first locating holes 111 of the base member 11 respectively with a respective screw 43.

By means of the aforesaid design, a notebook computer and a table PC can use the same design of base member 11 to save the manufacturing cost and to simplify the assembly process in the manufacturing line.

Although the present invention has been explained in relation to its preferred embodiment, it is to be understood that many other possible modifications and variations can be made without departing from the spirit and scope of the invention as hereinafter claimed.

What is claimed is:

1. A common pivot arrangement mounted on a base member of a portable computer, said base member comprising a plurality of first locating holes and a plurality of second locating holes, said common pivot arrangement comprising:
   a hinge unit, said hinge unit comprising a holder base and a hinge, said hinge comprising a fixed member fixedly mounted to said holder base and a rotatable member rotated about a first axis relative to said fixed member, said holder base comprising a plurality of first through holes corresponding to the second locating holes of said base member respectively and a plurality of second through holes; and
   a rotary device, said rotary device comprising a mount and a wheel pivotally mounted on said mount and rotated about a second axis relative to said mount, said second axis is perpendicular to said first axis, said mount comprising a plurality of through holes corresponding to the first locating holes of said base member respectively, said wheel comprising a plurality of mounting holes corresponding to the second through holes of said holder base of said hinge unit respectively.

2. The common pivot arrangement as claimed in claim 1, wherein said holder base further comprises stopper means; said mount further comprises stopper means adapted to stop the moving of the stopper means of said holder base.

3. The common pivot arrangement as claimed in claim 1, wherein said base member is comprised of a top shell and a bottom shell; said first locating holes and said second locating holes of said base member are respectively formed in said bottom shell and extending upwards.

4. The common pivot arrangement as claimed in claim 1, wherein said base member has a top surface and a keyboard installed in said top surface.

5. The common pivot arrangement as claimed in claim 2, wherein the stopper means of said holder base is a rod; the stopper means of said mount is an end of a guide slot.

6. The common pivot arrangement as claimed in claim 5, wherein the rod of said holder base is formed with a screw hole and a screw bolt threaded into said screw hole and movable with said holder base along the guide slot and stopped at the end of said guide slot of said mount.

* * * * *